(12) United States Patent
Lin

(10) Patent No.: US 12,744,652 B2
(45) Date of Patent: Sep. 22, 2026

(54) WIRELESS COMMUNICATION METHODS FOR PDCCH MONITORING, USER EQUIPMENT AND BASE STATION

(71) Applicant: GUANGDONG OPPO MOBILE TELECOMMUNICATIONS CORP., LTD., Dongguan (CN)

(72) Inventor: Hao Lin, Neuilly-sur-Seine (FR)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 364 days.

(21) Appl. No.: 18/370,512

(22) Filed: Sep. 20, 2023

(65) Prior Publication Data

US 2024/0014989 A1 Jan. 11, 2024

Related U.S. Application Data

(63) Continuation of application No. PCT/IB2021/000217, filed on Mar. 23, 2021.

(51) Int. Cl.
*H04L 5/00* (2006.01)

(52) U.S. Cl.
CPC .................................. *H04L 5/0092* (2013.01)

(58) Field of Classification Search
None
See application file for complete search history.

(56) References Cited

U.S. PATENT DOCUMENTS

2021/0212075 A1* 7/2021 Hosseini ................. H04W 8/24
2022/0201691 A1* 6/2022 Shi ...................... H04L 27/2602
2024/0056272 A1* 2/2024 Okano .................. H04W 52/02

OTHER PUBLICATIONS

International Search Report in the international application No. PCT/IB2021/000217, mailed on Dec. 21, 2021. 4 pages.
Written Opinion of the International Search Authority in the international application No. PCT/IB2021/000217, mailed on Dec. 21, 2021. 10 pages.
Nokia et al: "PDCCH monitoring enhancements", 3GPP Draft; R1-2100258, 3rd Generation Partnership Project (3GPP), Mobile Competence Centre; 650, Route Des Lucioles; F-06921 Sophia-Antipolis Cedex; France vol. RAN WG1, No. e-Meeting; Jan. 25, 2021-Feb. 5, 2021 (Jan. 18, 2021), XP051970880, p. 2-p. 4, figure 2. 5 pages.
Qualcomm Incorporated: "PDCCH monitoring enhancements",3GPP Draft; R1-2101454, 3rd Generation Partnership Project (3GPP), Mobile Competence Centre; 650, Route Des Lucioles; F-06921 Sophia-Antipolis Cedex; France vol. RAN WG1, No. e-Meeting; Jan. 25, 2021-Feb. 5, 2021 Jan. 19, 2021 (Jan. 19, 2021), XP051971619, p. 1-p. 3. 4 pages.
3GPP TR 38.808 V0.2.0 (Nov. 2020), 3rd Generation Partnership Project; Technical Specification Group Radio Access Network; Study on supporting NR from 52.6 GHz to 71 GHz (Release 17). Section 4 inspired our disclosure. 161 pages.

* cited by examiner

*Primary Examiner* — Saad Khawar
(74) *Attorney, Agent, or Firm* — BAYES PLLC

(57) ABSTRACT

Wireless communication methods for PDCCH monitoring, a user equipment and base station are provided. The method by a user equipment (UE) includes determining a span combination including a first parameter and a second parameter for subcarrier spacing higher than 60 kHz, the first parameter is a distance between two consecutive spans, and the second parameter is a span length.

16 Claims, 5 Drawing Sheets slot duration with 120kHz
slot
slot
slot duration with 960kHz slot duration with 120kHz
slot
slot
slot duration with 960kHz symbol
0
1
2
3
4
5
6
7
8
9
10
11
12
13
span (Y=3 symbol)
span (Y=6 symbol)
span (Y=9 symbol)
span (Y=12 symbol)

slot
slot
span (Y=0.5 slot)
span (Y=1 slot)
span (Y=2 slot)

WIRELESS COMMUNICATION METHODS FOR PDCCH MONITORING, USER EQUIPMENT AND BASE STATION

CROSS-REFERENCE TO RELATED APPLICATION

This application is a continuation of International Patent Application No. PCT/IB2021/000217, filed on Mar. 23, 2021, the disclosure of which is hereby incorporated by reference in its entirety.

BACKGROUND

In an unlicensed band, an unlicensed spectrum is a shared spectrum. Communication equipment in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum. For example, a communication device follows a listen before talk (LBT) or channel access procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT). LBT mechanism is also called a channel access procedure. In new radio (NR) Release 16, there are different types of channel access procedures, e.g., type 1, type 2A, type 2B and type 2C channel access procedures as described in TS 37.213.

In NR Release16 systems, an operation frequency range is limited to below 52.6 GHz. To further boost a data throughput, future network can further envision using higher frequency range, e.g., above 52.6 GHz. However, in some regions, the frequency above 52.6 GHz, e.g., 60 GHz, is a shared spectrum. Moreover, a power spectrum density is limited in this frequency band. In this case, a physical uplink control channel (PUCCH) transmission robustness or coverage will be limited accordingly. Further, in NR Release16 systems, a span framework is introduced to define a user equipment (UE) physical downlink control channel (PDCCH) monitoring capability. Current span distance cannot be enough for the UE to complete a processing for PDCCH monitoring.

Therefore, there is a need for an apparatus and a method for PDCCH monitoring, which can solve issues in the prior art.

SUMMARY

The present disclosure relates to the field of communication systems, and more particularly, to wireless communication methods, a user equipment and base station, which can provide a good communication performance and/or high reliability.

An object of the present disclosure is to propose an apparatus (such as a user equipment (UE) and/or a base station) and a method of wireless communication, which can solve issues in the prior art, improve a span design to support higher subcarrier spacing (SCS) cases, provide a span distance for a UE to complete a processing for physical downlink control channel (PDCCH) monitoring, provide a good communication performance, and/or provide high reliability.

In a first aspect of the present disclosure, a method of wireless communication by a user equipment (UE) comprises determining a span combination comprising a first parameter and a second parameter for subcarrier spacing higher than 60 kHz, wherein the first parameter is a distance between two consecutive spans, and the second parameter is a span length.

In a second aspect of the present disclosure, a method of wireless communication by a base station comprises controlling a user equipment (UE) to determine a span combination comprising a first parameter and a second parameter for subcarrier spacing higher than 60 kHz, wherein the first parameter is a distance between two consecutive spans, and the second parameter is a span length.

In a third aspect of the present disclosure, a user equipment comprises a memory, a transceiver, and a processor coupled to the memory and the transceiver. The processor is configured to determine a span combination comprising a first parameter and a second parameter for subcarrier spacing higher than 60 kHz, wherein the first parameter is a distance between two consecutive spans, and the second parameter is a span length.

In a fourth aspect of the present disclosure, a base station comprises a memory, a transceiver, and a processor coupled to the memory and the transceiver. The processor is configured to control a user equipment (UE) to determine a span combination comprising a first parameter and a second parameter for subcarrier spacing higher than 60 kHz, wherein the first parameter is a distance between two consecutive spans, and the second parameter is a span length.

BRIEF DESCRIPTION OF THE DRAWINGS

In order to illustrate the embodiments of the present disclosure or related art more clearly, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

For uplink transmissions in a shared spectrum, a UE may perform a channel access procedure before transmitting one or more uplink transmissions in a channel. The channel access procedure comprises a type 1 channel access according to section 4.2.1.1 of TS37.213, or a type 2A channel access according to section 4.2.1.2.1 of TS37.213, or a type 2B channel access according to section 4.2.1.2.2 of TS37.213, or a type 2C channel access according to section 4.2.1.2.3 of TS37.213.

Figure 1:
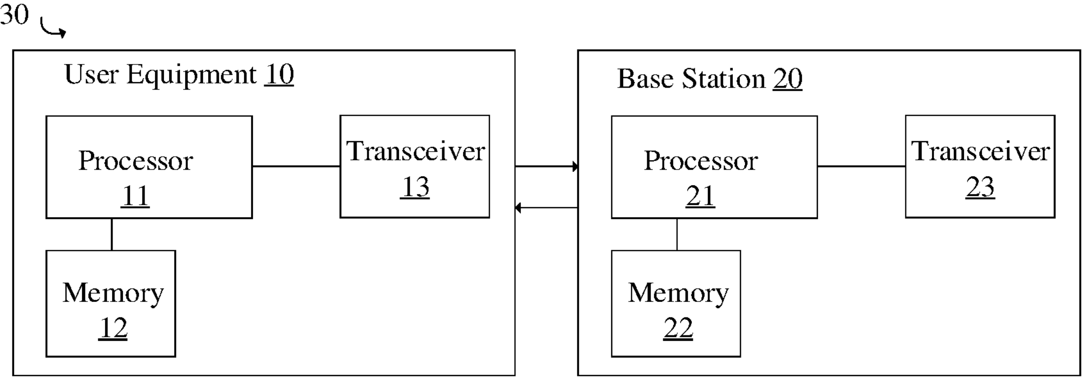
FIG. 1 is a schematic diagram illustrating an example of three span combinations.

FIG. 1 illustrates an example of three span combinations. In new radio (NR) Release 16, a span framework is introduced to define a user equipment (UE) physical downlink control channel (PDCCH) monitoring capability. In an example, a span combination is defined by two parameters, named X and Y, where X is a distance between two consecutive spans, while Y is a span length. In Release 16, possible span combinations are {X, Y}={(2, 2), (4, 3), (7, 3)}. For these three span combinations, the unit is symbol. FIG. 1 gives an example of the three span combinations.

With defined span combinations, UE PDCCH monitoring capability is defined within each span. The PDCCH monitoring capability includes a number of PDCCH candidates that a UE is able to monitor and a number of non-overlapped control channel elements (CCEs) that the UE is able to perform channel estimation. In TS 38.213 V16, the defined PDCCH monitoring capability is presented below as Table 1 and Table 2.

TABLE 1

| μ | Maximum number $M_{PDCCH}^{max,(X,Y),\mu}$ of monitored PDCCH candidates per span for combination (X, Y) and per serving cell | | |
|---|---|---|---|
| | (2, 2) | (4, 3) | (7, 3) |
| 0 | 14 | 28 | 44 |
| 1 | 12 | 24 | 36 |

TABLE 2

| μ | Maximum number $C_{PDCCH}^{max,(X,Y),\mu}$ of non-overlapped CCEs per span for combination (X, Y) and per serving cell | | |
|---|---|---|---|
| | (2, 2) | (4, 3) | (7, 3) |
| 0 | 18 | 36 | 56 |
| 1 | 18 | 36 | 56 |

Towards higher carrier frequency above 52.6 GHz, a subcarrier spacing is increased to 120 kHz, 480 kHz, and 960 kHz, which leads to a much reduced symbol duration compared to NR Release 15 and Release 16. In this case, a span distance, e.g., X=2 symbols, or X=4 symbols, or X=7 symbols cannot be enough for the UE to complete the processing for PDCCH monitoring. To solve this issue, in some embodiments of the present disclosure, a span design needs to be modified, such that the UE can have extended processing time. To this end, the span parameters X and Y need to be adapted to support higher SCS cases in some embodiments of the present disclosure.

Figure 2:
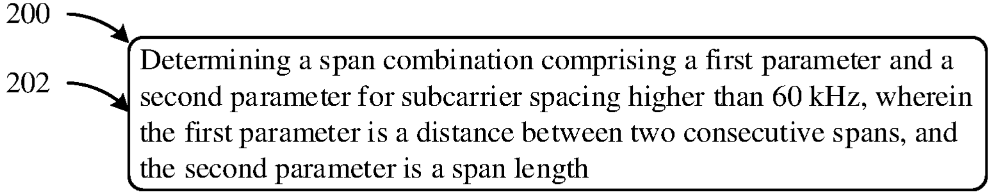
FIG. 2 is a block diagram of one or more user equipments (UEs) and a base station (e.g., gNB) of communication in a communication network system according to an embodiment of the present disclosure.

FIG. 2 illustrates that, in some embodiments, one or more user equipments (UEs) 10 and a base station (e.g., gNB) 20 for transmission adjustment in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12 and the transceiver 13. The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to determine a span combination comprising a first parameter and a second parameter for subcarrier spacing higher than 60 kHz, wherein the first parameter is a distance between two consecutive spans, and the second parameter is a span length. This can solve issues in the prior art, improve a span design to support higher subcarrier spacing (SCS) cases, provide a span distance for a UE to complete a processing for physical downlink control channel (PDCCH) monitoring, provide a good communication performance, and/or provide high reliability.

In some embodiments, the processor 21 is configured to control the UE 10 to determine a span combination comprising a first parameter and a second parameter for subcarrier spacing higher than 60 kHz, wherein the first parameter is a distance between two consecutive spans, and the second parameter is a span length. This can solve issues in the prior art, improve a span design to support higher subcarrier spacing (SCS) cases, provide a span distance for a UE to complete a processing for physical downlink control channel (PDCCH) monitoring, provide a good communication performance, and/or provide high reliability.

Figure 3:
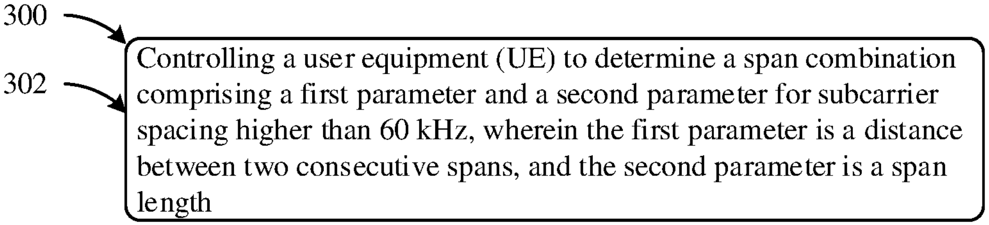
FIG. 3 is a flowchart illustrating a method of wireless communication performed by a user equipment (UE) according to an embodiment of the present disclosure.

FIG. 3 illustrates a method 200 of wireless communication by a user equipment (UE) according to an embodiment of the present disclosure. In some embodiments, the method 200 includes: a block 202, determining a span combination comprising a first parameter and a second parameter for subcarrier spacing higher than 60 kHz, wherein the first parameter is a distance between two consecutive spans, and the second parameter is a span length. This can solve issues in the prior art, improve a span design to support higher subcarrier spacing (SCS) cases, provide a span distance for a UE to complete a processing for physical downlink control channel (PDCCH) monitoring, provide a good communication performance, and/or provide high reliability.

Figure 4:
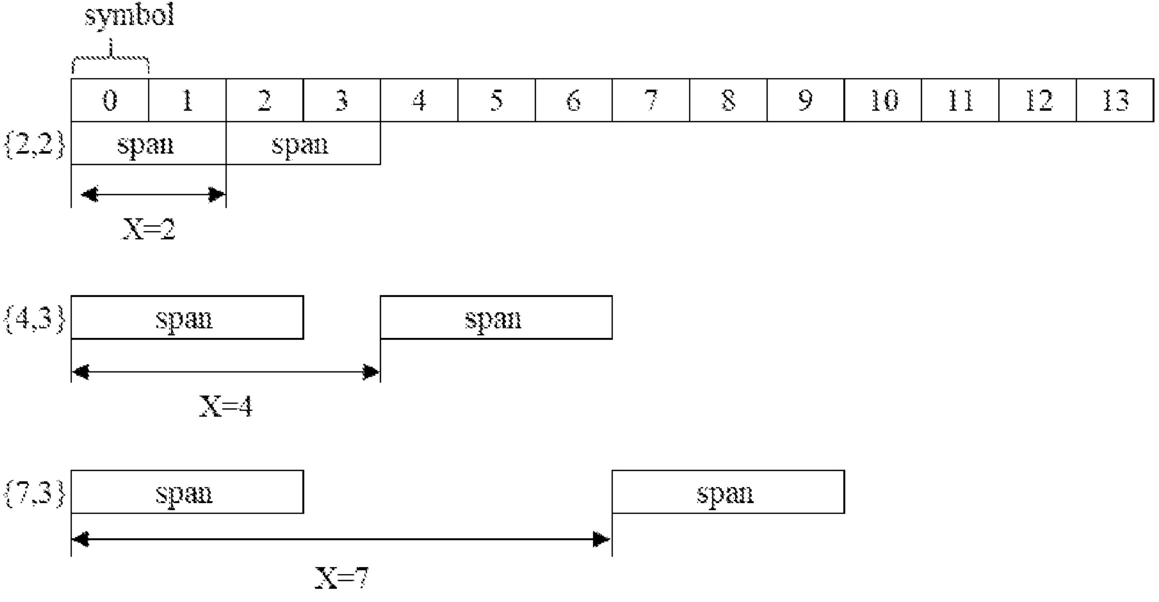
FIG. 4 is a flowchart illustrating a method of wireless communication performed by a base station according to an embodiment of the present disclosure.

FIG. 4 illustrates a method 300 of wireless communication by a base station according to an embodiment of the present disclosure. In some embodiments, the method 300 includes: a block 302, controlling a user equipment (UE) to determine a span combination comprising a first parameter and a second parameter for subcarrier spacing higher than 60 kHz, wherein the first parameter is a distance between two consecutive spans, and the second parameter is a span length. This can solve issues in the prior art, improve a span design to support higher subcarrier spacing (SCS) cases, provide a span distance for a UE to complete a processing for physical downlink control channel (PDCCH) monitoring, provide a good communication performance, and/or provide high reliability.

In some embodiments, the first parameter is a distance between starting locations of the two consecutive spans. In some embodiments, a value of the first parameter and/or a value of the second parameter is in a unit of a slot, a symbol, or an absolute time. In some embodiments, the value of the first parameter and/or the value of the second parameter corresponds to 120 kHz subcarrier spacing (SCS), and/or the first parameter and the second parameter are used for carrier frequency higher than 52.6 GHz. In some embodiments, the value of the first parameter and/or the value of the second parameter depends on a first SCS value. In some embodiments, the first SCS value is equal to 120 kHz, 480 kHz, or 960 kHz. In some embodiments, when the first SCS value is equal to 120 kHz, the value of the first parameter comprises 1 slot corresponding to 1 slot duration with 120 kHz SCS, 2 slots corresponding to 2 slot durations with 120 kHz SCS, or a half slot corresponding to a half slot duration with 120 kHz SCS. In some embodiments, when the first SCS value is equal to 120 kHz, the value of the first parameter comprises 14 symbols corresponding to 1 slot duration with 120 kHz SCS, 28 symbols corresponding to 2 slot durations with 120 kHz SCS, or 7 symbols corresponding to a half slot duration with 120 kHz SCS.

In some embodiments, when the first SCS value is equal to 120 kHz, the value of the first parameter comprises 0.03125 millisecond corresponding to 1 slot duration with 120 kHz SCS, 0.0625 millisecond corresponding to 2 slot durations with 120 kHz SCS, or 0.015625 millisecond corresponding to a half slot duration with 120 kHz SCS. In some embodiments, when the first SCS value is equal to 480 kHz, the value of the first parameter comprises 4 slots corresponding to 1 slot duration with 120 kHz SCS, 8 slots corresponding to 2 slot durations with 120 kHz SCS, or 2 slots corresponding to a half slot duration with 120 kHz SCS. In some embodiments, when the first SCS value is equal to 480 kHz, the value of the first parameter comprises 56 symbols corresponding to 1 slot duration with 120 kHz SCS, 112 symbols corresponding to 2 slot durations with 120 kHz SCS, or 28 symbols corresponding to a half slot duration with 120 kHz SCS. In some embodiments, when the first SCS value is equal to 480 kHz, the value of the first parameter comprises 0.125 millisecond corresponding to 1 slot duration with 120 kHz SCS, 0.25 millisecond corresponding to 2 slot durations with 120 kHz SCS, or 0.0625 millisecond corresponding to a half slot duration with 120 kHz SCS. In some embodiments, when the first SCS value is equal to 960 kHz, the value of the first parameter comprises 8 slots corresponding to 1 slot duration with 120 kHz SCS, 16 slots corresponding to 2 slot durations with 120 kHz SCS, or 4 slots corresponding to a half slot duration with 120 kHz SCS.

In some embodiments, when the first SCS value is equal to 960 kHz, the value of the first parameter comprises 112 symbols corresponding to 1 slot duration with 120 kHz SCS, 224 symbols corresponding to 2 slot durations with 120 kHz SCS, or 56 symbols corresponding to a half slot duration with 120 kHz SCS. In some embodiments, when the first SCS value is equal to 960 kHz, the value of the first parameter comprises 0.25 millisecond corresponding to 1 slot duration with 120 kHz SCS, 0.5 millisecond corresponding to 2 slot durations with 120 kHz SCS, or 0.125 millisecond corresponding to a half slot duration with 120 kHz SCS. In some embodiments, the value of the second parameter fit a control resource set (CORESET) length. In some embodiments, the value of the second parameter comprises multiple of 3 symbols. In some embodiments, the value of the second parameter comprises 6 symbols, 9 symbols, or 12 symbols. In some embodiments, the value of the second parameter comprises at least one of the followings: 2 symbols, 3 symbols, 6 symbols, 7 symbols, 9 symbols, 12 symbols, 14 symbols, 28 symbols, a half slot, 1 slot, 2 slots. In some embodiments, when the first SCS value is equal to 480 kHz, the value of the first parameter comprises least one of the followings: 2 slots, 4 slots, or 8 slots, and/or the value of the second parameter comprises least one of the followings: 2 symbols, 3 symbols, 6 symbols, 9 symbols, 12 symbols, a half slot, 1 slot, or 2 slots.

In some embodiments, when the first SCS value is equal to 960 kHz, the value of the first parameter comprises least one of the followings: 4 slots, 8 slots, or 16 slots, and/or the value of the second parameter comprises least one of the followings: 2 symbols, 3 symbols, 6 symbols, 9 symbols, 12 symbols, a half slot, 1 slot, or 2 slots. In some embodiments, the first parameter, the second parameter, and/or the span combination defines a physical downlink control channel (PDCCH) monitoring capability. In some embodiments, the PDCCH monitoring capability comprises a number of PDCCH candidates and a number of non-overlapped control channel elements (CCEs). In some embodiments, for a given value of the first parameter, the PDCCH monitoring capability is the same. In some embodiments, for a given value of the first parameter and for different values of the second parameter, the PDCCH monitoring capability is the same. In some embodiments, when the first SCS value is equal to 480 kHz, at least one of the following is met: the given value of the first parameter comprises 2 slots, and the number of PDCCH candidates comprises 10 and/or 12; the given value of the first parameter comprises 4 slots, and the number of PDCCH candidates comprises 20; the given value of the first parameter comprises 8 slots, and the number of PDCCH candidates comprises 40 and/or 20; the given value of the first parameter comprises 2 slots, and the number of non-overlapped CCEs comprises 16 and/or 18; the given value of the first parameter comprises 4 slots, and the number of non-overlapped CCEs comprises 32; or the given value of the first parameter comprises 8 slots, and the number of non-overlapped CCEs comprises 64 and/or 32.

In some embodiments, when the first SCS value is equal to 960 kHz, at least one of the following is met: the given value of the first parameter comprises 4 slots, and the number of PDCCH candidates comprises 10 and/or 12; the given value of the first parameter comprises 8 slots, and the number of PDCCH candidates comprises 20; the given value of the first parameter comprises 16 slots, and the number of PDCCH candidates comprises 40 and/or 20; the given value of the first parameter comprises 4 slots, and the number of non-overlapped CCEs comprises 16 and/or 18; the given value of the first parameter comprises 8 slots, and the number of non-overlapped CCEs comprises 32; or the given value of the first parameter comprises 16 slots, and the number of non-overlapped CCEs comprises 64 and/or 32. In some embodiments, for a given value of the first parameter, when the value of the second parameter is equal to or less than a threshold value, there is a first PDCCH monitoring capability, and/or for the given value of the first parameter, when the value of the second parameter is greater than the threshold value, there is a second PDCCH monitoring capability. In some embodiments, the threshold value comprises 3 symbols or a half slot.

In some embodiments, when the first SCS value is equal to 480 kHz, at least one of the following is met: the given value of the first parameter comprises 2 slots, the value of the second parameter is equal to or less than the threshold value, and a number of PDCCH candidates of the first PDCCH monitoring capability comprises 10 and/or 12; the given value of the first parameter comprises 4 slots, the value of the second parameter is equal to or less than the threshold value, and the number of PDCCH candidates of the first PDCCH monitoring capability comprises 20; the given value of the first parameter comprises 8 slots, the value of the second parameter is equal to or less than the threshold value, and the number of PDCCH candidates of the first PDCCH monitoring capability comprises 40 and/or 20; the given value of the first parameter comprises 2 slots, the value of the second parameter is equal to or less than the threshold value, and a number of non-overlapped CCEs of the first PDCCH monitoring capability comprises 16 and/or 18; the given value of the first parameter comprises 4 slots, the value of the second parameter is equal to or less than the threshold value, and the number of non-overlapped CCEs of the first PDCCH monitoring capability comprises 32; the given value of the first parameter comprises 8 slots, the value of the second parameter is equal to or less than the threshold value, and the number of non-overlapped CCEs of the first PDCCH monitoring capability comprises 64 and/or 32; the given value of the first parameter comprises 2 slots, the value of the second parameter is greater than the threshold value, and a number of PDCCH candidates of the second PDCCH monitoring capability comprises 20; the given value of the first parameter comprises 4 slots, the value of the second parameter is greater than the threshold value, and the number of PDCCH candidates of the second PDCCH monitoring capability comprises 40; the given value of the first parameter comprises 8 slots, the value of the second parameter is greater than the threshold value, and the number of PDCCH candidates of the second PDCCH monitoring capability comprises 80; the given value of the first parameter comprises 2 slots, the value of the second parameter is greater than the threshold value, and a number of non-overlapped CCEs of the second PDCCH monitoring capability comprises 32; the given value of the first parameter comprises 4 slots, the value of the second parameter is greater than the threshold value, and the number of non-overlapped CCEs of the second PDCCH monitoring capability comprises 64; or the given value of the first parameter comprises 8 slots, the value of the second parameter is greater than the threshold value, and the number of non-overlapped CCEs of the second PDCCH monitoring capability comprises 128.

In some embodiments, when the first SCS value is equal to 960 kHz, at least one of the following is met: the given value of the first parameter comprises 4 slots, the value of the second parameter is equal to or less than the threshold value, and a number of PDCCH candidates of the first PDCCH monitoring capability comprises 10 and/or 12; the given value of the first parameter comprises 8 slots, the value of the second parameter is equal to or less than the threshold value, and the number of PDCCH candidates of the first PDCCH monitoring capability comprises 20; the given value of the first parameter comprises 16 slots, the value of the second parameter is equal to or less than the threshold value, and the number of PDCCH candidates of the first PDCCH monitoring capability comprises 40 and/or 20; the given value of the first parameter comprises 4 slots, the value of the second parameter is equal to or less than the threshold value, and a number of non-overlapped CCEs of the first PDCCH monitoring capability comprises 16 and/or 18; the given value of the first parameter comprises 8 slots, the value of the second parameter is equal to or less than the threshold value, and the number of non-overlapped CCEs of the first PDCCH monitoring capability comprises 32; the given value of the first parameter comprises 16 slots, the value of the second parameter is equal to or less than the threshold value, and the number of non-overlapped CCEs of the first PDCCH monitoring capability comprises 64 and/or 32; the given value of the first parameter comprises 4 slots, the value of the second parameter is greater than the threshold value, and a number of PDCCH candidates of the second PDCCH monitoring capability comprises 20; the given value of the first parameter comprises 8 slots, the value of the second parameter is greater than the threshold value, and the number of PDCCH candidates of the second PDCCH monitoring capability comprises 40; the given value of the first parameter comprises 16 slots, the value of the second parameter is greater than the threshold value, and the number of PDCCH candidates of the second PDCCH monitoring capability comprises 80; the given value of the first parameter comprises 4 slots, the value of the second parameter is greater than the threshold value, and a number of non-overlapped CCEs of the second PDCCH monitoring capability comprises 32; the given value of the first parameter comprises 8 slots, the value of the second parameter is greater than the threshold value, and the number of non-overlapped CCEs of the second PDCCH monitoring capability comprises 64; or the given value of the first parameter comprises 16 slots, the value of the second parameter is greater than the threshold value, and the number of non-overlapped CCEs of the second PDCCH monitoring capability comprises 128.

In some embodiments, the UE determines a span from a set of span combinations. In some embodiments, the UE is configured, by a base station, with one or more PDCCH monitoring occasions. In some embodiments, the UE is configured to determine the span from the one or more PDCCH monitoring occasions. In some embodiments, the UE determines the span such that the span starts at a first symbol where a PDCCH monitoring occasion starts and ends at a last symbol where the PDCCH monitoring occasion ends. In some embodiments, the PDCCH monitoring occasion is within a duration of the second parameter. In some embodiments, the span length is equal to a duration between a starting location of the PDCCH monitoring occasion and an end location of the PDCCH monitoring occasion. In some embodiments, the span is defined or determined within a slot. In some embodiments, the span is cross slots and/or the span is determined within a slot group, where the slot group comprises more than one slot. In some embodiments, the UE reports, to the base station, about one or more supporting span combinations of the UE. In some embodiments, the one or more PDCCH monitoring occasions are configured according to the one or more supporting span combinations of the UE. In some embodiments, the UE determines the span combination that the PDCCH monitoring occasion fits in. In some embodiments, the UE uses the span combination that gives a maximum number of PDCCH candidates and/or a maximum number of CCEs for PDCCH monitoring. In some embodiments, the UE monitors a PDCCH using the PDCCH monitoring capability corresponding to a determined span combination.

Example 1

Figure 5:
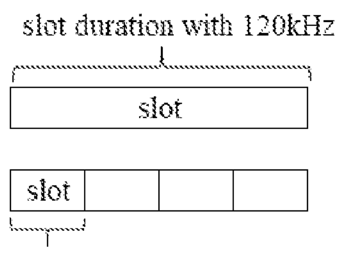
FIG. 5 is a schematic diagram illustrating that for SCS=480 kHz, a first parameter X of a span combination may comprise 4 slots corresponding to 1 slot duration with 120 kHz according to an embodiment of the present disclosure.
Figure 6:
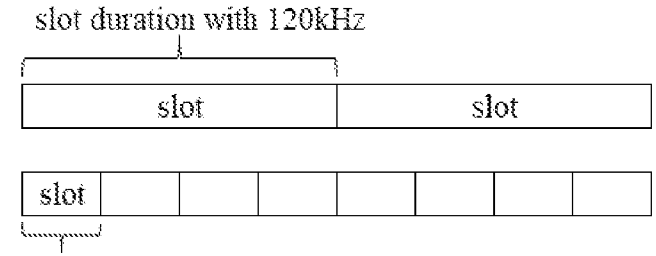
FIG. 6 is a schematic diagram illustrating that for SCS=480 kHz, a first parameter X of a span combination may comprise 8 slots corresponding to 2 slot durations with 120 kHz according to an embodiment of the present disclosure.
Figure 7:
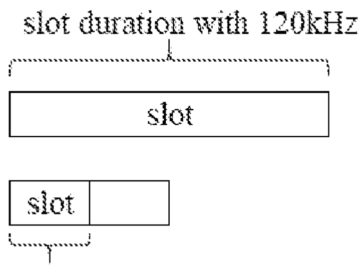
FIG. 7 is a schematic diagram illustrating that for SCS=480 kHz, a first parameter X of a span combination may comprise 2 slots corresponding to a half slot duration with 120 kHz according to an embodiment of the present disclosure.

FIG. 5 illustrates that for SCS=480 kHz, a first parameter X of a span combination may comprise 4 slots corresponding to 1 slot duration with 120 kHz according to an embodiment of the present disclosure. FIG. 6 illustrates that for SCS=480 kHz, a first parameter X of a span combination may comprise 8 slots corresponding to 2 slot durations with 120 kHz according to an embodiment of the present disclosure. FIG. 7 illustrates that for SCS=480 kHz, a first parameter X of a span combination may comprise 2 slots corresponding to a half slot duration with 120 kHz according to an embodiment of the present disclosure. FIG. 5 to FIG. 7 illustrate that, in some embodiments, for a span combination {X, Y}, a value of a first parameter X represents an integer number of slots. The number is selected according to the slot duration corresponding to 120 kHz subcarrier spacing (SCS). As an example, for SCS=480 kHz, X may comprise 4 slots corresponding to 1 slot duration with 120 kHz as illustrated in FIG. 5, or X may comprise 8 slots corresponding to 2 slots duration with 120 kHz, as illustrated in FIG. 6. With the extended X values, the span distance can maintain quasi-equivalent to the distance required for Release 16 UEs, which does not require a more enhanced or more advanced receiver design. Optionally, to support low latency service, UE PDCCH may be designed with much higher capability, e.g., X may comprise 2 slots corresponding to half slot duration with 120 kHz as illustrated in FIG. 7.

In some embodiments, for 480 kHz SCS, the value of X may be an integer number of symbols. The number is selected according to the slot duration corresponding to 120 kHz subcarrier spacing (SCS). For example, X may be 56 symbols corresponding to 1 slot duration with 120 kHz. Optionally, X may be 112 symbols corresponding to 2 slot duration with 120 kHz. Optionally, X may be 28 symbols corresponding to half slot duration with 120 kHz.

Figure 8:
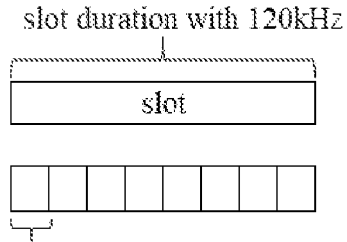
FIG. 8 is a schematic diagram illustrating that for SCS=960 kHz, a first parameter X of a span combination may comprise 8 slots corresponding to 1 slot duration with 120 kHz according to an embodiment of the present disclosure.
Figures 9, 10, 11, 12:
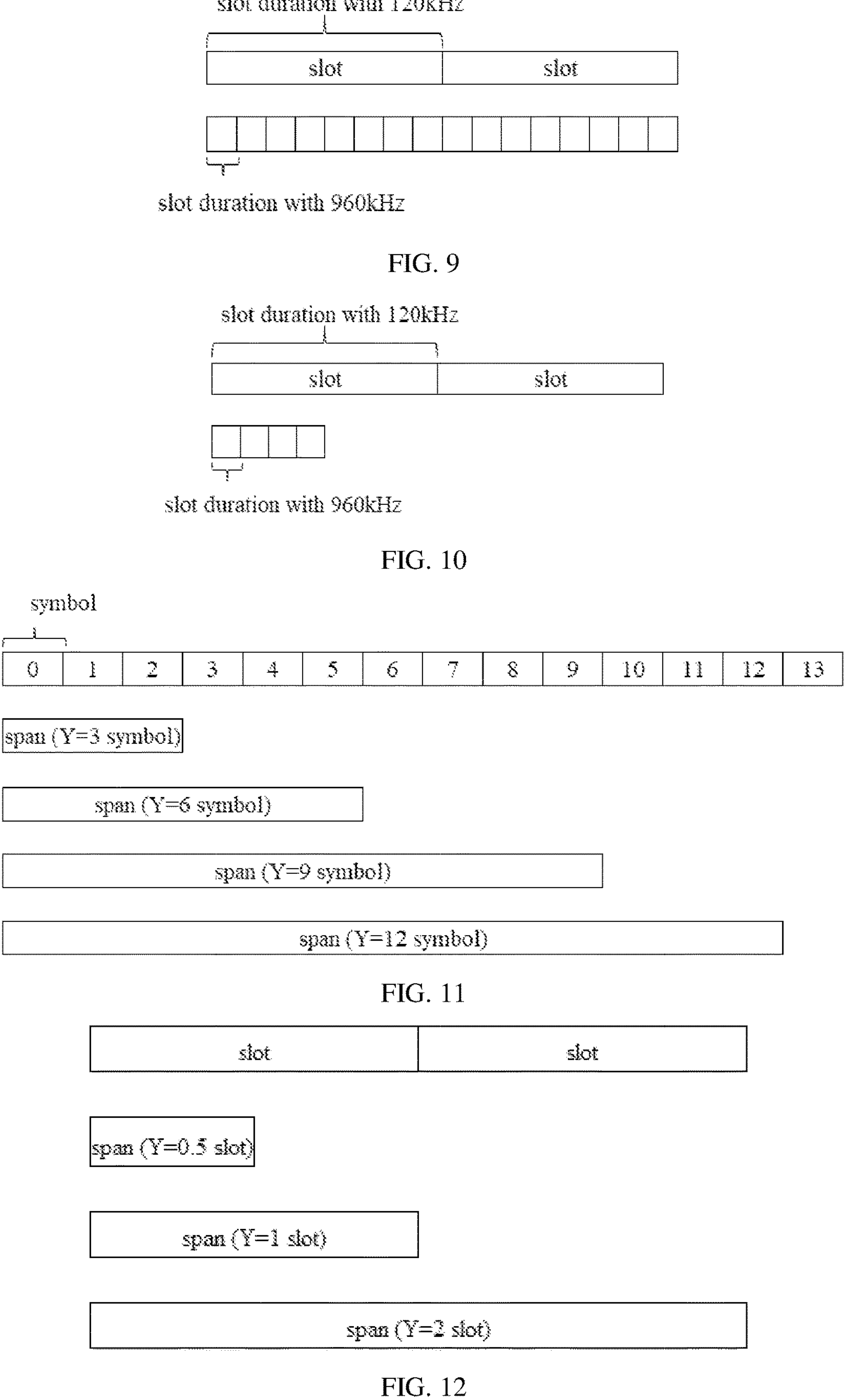
FIG. 9 is a schematic diagram illustrating that for SCS=960 kHz, a first parameter X of a span combination may comprise 16 slots corresponding to 2 slot durations with 120 kHz according to an embodiment of the present disclosure.
FIG. 10 is a schematic diagram illustrating that for SCS=960 kHz, a first parameter X of a span combination may comprise 4 slots corresponding to a half slot duration with 120 kHz according to an embodiment of the present disclosure.
FIG. 11 is a schematic diagram illustrating that a second parameter Y of a span combination may be multiple of 3 symbols according to an embodiment of the present disclosure.
FIG. 12 is a schematic diagram illustrating that a second parameter Y of a span combination may be a half slot according to an embodiment of the present disclosure.

FIG. 8 illustrates that for SCS=960 kHz, a first parameter X of a span combination may comprise 8 slots corresponding to 1 slot duration with 120 kHz according to an embodiment of the present disclosure. FIG. 9 illustrates that for SCS=960 kHz, a first parameter X of a span combination may comprise 16 slots corresponding to 2 slot durations with 120 kHz according to an embodiment of the present disclosure. FIG. 10 illustrates that for SCS=960 kHz, a first parameter X of a span combination may comprise 4 slots corresponding to a half slot duration with 120 kHz according to an embodiment of the present disclosure. FIG. 8 to FIG. 10 illustrate that, in some embodiments, for SCS=960 kHz, the X may be 8 slots corresponding to 1 slot duration with 120 kHz as illustrated in FIG. 8, or X may be 16 slots corresponding to 2 slots duration with 120 kHz, as illustrated in FIG. 9. Optionally, to support low latency service, the UE PDCCH may be designed with much higher capability, e.g., X may comprise 4 slots corresponding to half slot duration with 120 kHz as illustrated in FIG. 10.

Example 2

FIG. 11 illustrates that a second parameter Y of a span combination may be multiple of 3 symbols according to an embodiment of the present disclosure. FIG. 12 illustrates that a second parameter Y of a span combination may be a half slot according to an embodiment of the present disclosure. FIG. 11 and FIG. 12 illustrate that, in some embodiments, the span length is defined by a second parameter Y. The value of Y may be an integer of symbols. As an example, the value of Y may be smaller than or equal to 3. This length can fit a CORESET length, but if a network (such as a base station) configures multiple search spaces in a slot, the network needs to ensure that they fit into the span length of Y. Thus, if the span length is short, many search spaces may be overlapped in time domain, leading potentially to some blocking issue. To overcome this issue, optionally, the value of Y may be multiple of 3 symbols, e.g., 6 symbols, 9 symbols, or 12 symbols as illustrated in FIG. 11. Optionally, the value of Y may be in a unit of slot. As example, the value of Y is 1 slot. Optionally, the value of Y is more than 1 slot. Optionally, the value of Y is half slot as illustrated in FIG. 12.

In some embodiments, when the values of X and Y are defined, the span combination for carrier frequency higher than 52.6 GHz can be determined based on {X, Y}. Note that as presented in above examples, the values for X and Y may be defined depending on the SCS values, e.g., SCS=120 kHz, 480 kHz, or 960 kHz.

Example 3

In the previous examples, we have presented the span combinations {X, Y}, where for SCS=480 kHz, X may be at least one of the followings: 2 slots, 4 slots, 8 slots. And Y may be at least one of the followings: 2 symbols, 3 symbols, 6 symbols, 9 symbols, 12 symbols, 0.5 slot (7 symbols), 1 slot, or 2 slots. While for SCS=960 kHz, X may be at least one of the followings: 4 slots, 8 slots, or 16 slots. And Y may be at least one of the followings: 2 symbols, 3 symbols, 6 symbols, 9 symbols, 12 symbols, 0.5 slot (7 symbols), 1 slot, or 2 slots.

In some embodiments, the UE PDCCH monitoring capability is defined for a given span combination. The PDCCH monitoring capability is defined in terms of the number of PDCCH candidate and the number of non-overlapped CCEs per span combination. In some examples, the PDCCH monitoring capability is depending on the value of X, i.e., for a given X, for different values of Y, the PDCCH monitoring capability is the same.

For SCS=480 kHz:

| Value of X | #PDCCH candidate |
|---|---|
| 2 slots | 10 and/or 12 |
| 4 slots | 20 |
| 8 slots | 40 and/or 20 |

| Value of X | #CCE |
|---|---|
| 2 slots | 16 and/or 18 |
| 4 slots | 32 |
| 8 slots | 64 and/or 32 |

For SCS=960 kHz:

| Value of X | #PDCCH candidate |
|---|---|
| 4 slots | 10 and/or 12 |
| 8 slots | 20 |
| 16 slots | 40 and/or 20 |

| Value of X | #CCE |
|---|---|
| 4 slots | 16 and/or 18 |
| 8 slots | 32 |
| 16 slots | 64 and/or 32 |

In some examples, the PDCCH monitoring capability is depending on both X and Y. In this case, there may be a threshold value T, for a given X, when Y≤T, there is a PDCCH monitoring capability and when Y>T, there is another PDCCH monitoring capability. For example, the value of T may be 3 symbols or half slot.

For SCS=480 kHz:

| Value of X, and Y ≤ T | #PDCCH candidate |
|---|---|
| 2 slots | 10 and/or 12 |
| 4 slots | 20 |
| 8 slots | 40 and/or 20 |

| Value of X, and Y ≤ T | #CCE |
|---|---|
| 2 slots | 16 and/or 18 |
| 4 slots | 32 |
| 8 slots | 64 and/or 32 |

| Value of X, and Y > T | #PDCCH candidate |
|---|---|
| 2 slots | 20 |
| 4 slots | 40 |
| 8 slots | 80 |

| Value of and X, and Y > T | #CCE |
|---|---|
| 2 slots | 32 |
| 4 slots | 64 |
| 8 slots | 128 |

For SCS=960 kHz:

| Value of X, and Y ≤ T | #PDCCH candidate |
|---|---|
| 4 slots | 10 and/or 12 |
| 8 slots | 20 |
| 16 slots | 40 and/or 20 |

| Value of X, and Y ≤ T | #CCE |
|---|---|
| 4 slots | 16 and/or 18 |
| 8 slots | 32 |
| 16 slots | 64 and/or 32 |

| Value of X, and Y > T | #PDCCH candidate |
|---|---|
| 4 slots | 20 |
| 8 slots | 40 |
| 16 slots | 80 |

| Value of X, and Y > T | #CCE |
|---|---|
| 4 slots | 32 |
| 8 slots | 64 |
| 16 slots | 128 |

Example 4

Figure 13:
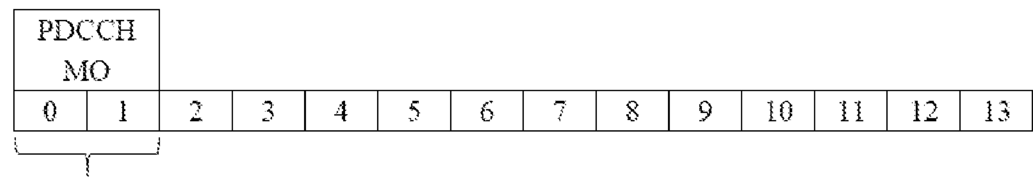
FIG. 13 is a schematic diagram illustrating that a base station configures a PDCCH occasion within a Y duration according to an embodiment of the present disclosure.

FIG. 13 illustrates that a base station configures a PDCCH occasion within a Y duration according to an embodiment of the present disclosure. A UE needs to determine a span from a set of span combinations presented in above examples. The UE determines from configured PDCCH monitoring occasions. In case the span is in unit of symbols, the UE will determine a span such that a span starts at a first symbol where a PDCCH monitoring occasion starts and ends at a last symbol where a PDCCH monitoring occasion ends. For example, as illustrated in FIG. 13, if the span combination has a value of Y being 3 symbols, a base station (such as a gNB) needs to configure PDCCH occasion within the Y duration. If the PDCCH monitoring occasion (MO) starts at symbol 0 and ends at symbol 1, then the UE determines a span length is 2 symbols.

Figure 14:
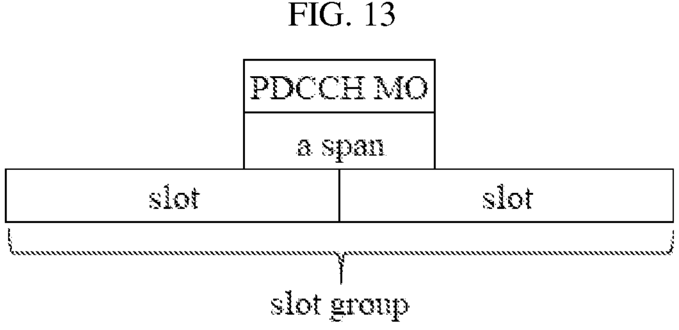
FIG. 14 is a schematic diagram illustrating that a span can be cross slots according to an embodiment of the present disclosure.

FIG. 14 illustrates that a span can be cross slots according to an embodiment of the present disclosure. In some examples, a span has to be defined or determined within a slot. Optionally, a span can be cross slots and/or a span can be determined within a slot group, where a slot group comprises more than one slot as illustrated in FIG. 14.

Figure 15:
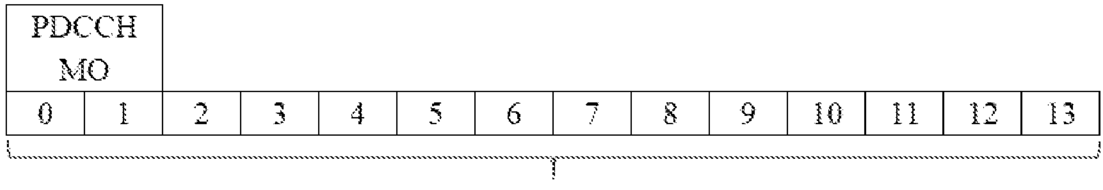
FIG. 15 is a schematic diagram illustrating a PDCCH monitoring occasion according to an embodiment of the present disclosure.

FIG. 15 illustrates a PDCCH monitoring occasion according to an embodiment of the present disclosure. FIG. 15 illustrates that, in some examples, the span unit is slot, then the UE determines the span such that a span starts at a slot in which a first symbol where a PDCCH monitoring occasion starts is located and ends at a slot in which a last symbol where a PDCCH monitoring occasion ends is located, where the number of slots of the span is up to Y.

Example 5

Figure 16:
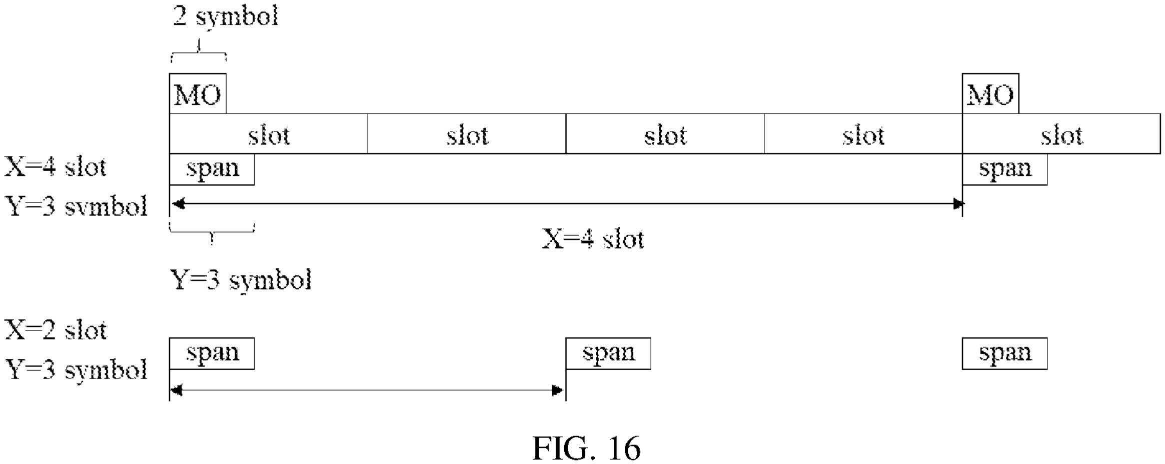
FIG. 16 is a schematic diagram illustrating a PDCCH monitoring occasion and span combinations according to an embodiment of the present disclosure.

FIG. 16 illustrates a PDCCH monitoring occasion and span combinations according to an embodiment of the present disclosure. In some examples, a UE reports to a network about supporting span combinations, i.e., supported {X, Y}. Then the network will configure the PDCCH monitoring occasion according to the UE supported span combinations. From the UE side, once the PDCCH monitoring occasion is configured, the UE will determine a span combination that the configured PDCCH MO fits to. The UE will monitor the PDCCH using the PDCCH monitoring capability corresponding to the determined span combination. As illustrated in FIG. 16, assume that the UE reports to the network that the UE supports two {X, Y} span combinations, i.e., {X=4 slots, Y=3 symbols} and {X=2 slots, Y=3 symbols}. Then, after a network configuration on the PDCCH monitoring occasions, the UE determines a span combination that the PDCCH MO fits in. In our example, since the MO can be covered by both span combinations, the UE will use a span combination that gives the maximum number of PDCCH candidate and CCEs for PDCCH monitoring.

Commercial interests for some embodiments are as follows. 1. Solving issues in the prior art 2. Improving a span design to support higher subcarrier spacing (SCS) cases. 3. Providing a span distance for a UE to complete a processing for physical downlink control channel (PDCCH) monitoring. 4. Providing a good communication performance 5. Providing a high reliability. 6. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 17:
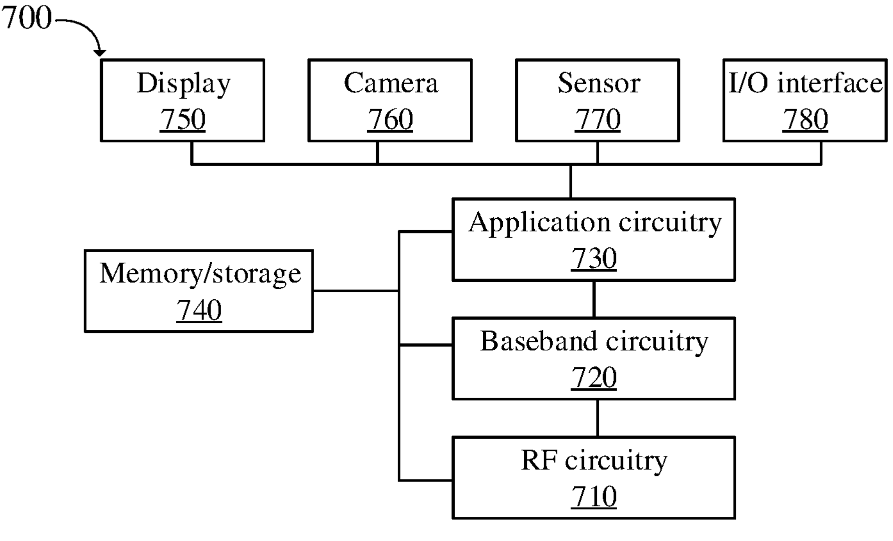
FIG. 17 is a block diagram of a system for wireless communication according to an embodiment of the present disclosure.

FIG. 17 is a block diagram of an example system 700 for wireless communication according to an embodiment of the present disclosure. Embodiments described herein may be implemented into the system using any suitably configured hardware and/or software. FIG. 17 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:

determining a span combination comprising a first parameter and a second parameter for subcarrier spacing higher than 60 kHz, wherein the first parameter is a distance between two consecutive spans, and the second parameter is a span length, wherein the first parameter and the second parameter define a physical downlink control channel (PDCCH) monitoring capability, the PDCCH monitoring capability comprises a number of PDCCH candidates and a number of non-overlapped control channel elements (CCEs), and wherein for a given value of the first parameter, when a value of the second parameter is equal to or less than a threshold value, there is a first PDCCH monitoring capability, and for the given value of the first parameter, when the value of the second parameter is greater than the threshold value, there is a second PDCCH monitoring capability, wherein the threshold value comprises 3 symbols or a half slot, and wherein the number of PDCCH candidates and the number of non-overlapped CCEs in the first PDCCH monitoring capability are different from the number of PDCCH candidates and the number of non-overlapped CCEs in the second PDCCH monitoring capability.

2. The method of claim 1, wherein the first parameter is a distance between starting locations of the two consecutive spans.

3. The method of claim 1, wherein the value of the first parameter and/or the value of the second parameter is in a unit of a slot, a symbol, or an absolute time, and the value of the first parameter and/or the value of the second parameter corresponds to 120 kHz subcarrier spacing (SCS), and/or the first parameter and the second parameter are used for carrier frequency higher than 52.6 GHz.

4. The method of claim 3, wherein the value of the first parameter and/or the value of the second parameter depends on a first SCS value, and one of the following applies:

when the first SCS value is equal to 120 kHz, the value of the first parameter comprises 1 slot corresponding to 1 slot duration with 120 kHz SCS, 2 slots corresponding to 2 slot durations with 120 kHz SCS, or a half slot corresponding to a half slot duration with 120 kHz SCS;

when the first SCS value is equal to 120 kHz, the value of the first parameter comprises 14 symbols corresponding to 1 slot duration with 120 kHz SCS, 28 symbols corresponding to 2 slot durations with 120 kHz SCS, or 7 symbols corresponding to a half slot duration with 120 kHz SCS;

when the first SCS value is equal to 120 kHz, the value of the first parameter comprises 0.03125 millisecond corresponding to 1 slot duration with 120 kHz SCS, 0.0625 millisecond corresponding to 2 slot durations with 120 kHz SCS, or 0.015625 millisecond corresponding to a half slot duration with 120 kHz SCS;

when the first SCS value is equal to 480 kHz, the value of the first parameter comprises 4 slots corresponding to 1 slot duration with 120 kHz SCS, 8 slots corresponding to 2 slot durations with 120 kHz SCS, or 2 slots corresponding to a half slot duration with 120 kHz SCS;

when the first SCS value is equal to 480 kHz, the value of the first parameter comprises 56 symbols corresponding to 1 slot duration with 120 kHz SCS, 112 symbols corresponding to 2 slot durations with 120 kHz SCS, or 28 symbols corresponding to a half slot duration with 120 kHz SCS;

when the first SCS value is equal to 480 kHz, the value of the first parameter comprises 0.125 millisecond corresponding to 1 slot duration with 120 kHz SCS, 0.25 millisecond corresponding to 2 slot durations with 120 kHz SCS, or 0.0625 millisecond corresponding to a half slot duration with 120 kHz SCS;

when the first SCS value is equal to 960 kHz, the value of the first parameter comprises 8 slots corresponding to 1 slot duration with 120 kHz SCS, 16 slots corresponding to 2 slot durations with 120 kHz SCS, or 4 slots corresponding to a half slot duration with 120 kHz SCS;

when the first SCS value is equal to 960 kHz, the value of the first parameter comprises 112 symbols corresponding to 1 slot duration with 120 kHz SCS, 224 symbols corresponding to 2 slot durations with 120 kHz SCS, or 56 symbols corresponding to a half slot duration with 120 kHz SCS;

when the first SCS value is equal to 960 kHz, the value of the first parameter comprises 0.25 millisecond corresponding to 1 slot duration with 120 kHz SCS, 0.5 millisecond corresponding to 2 slot durations with 120 kHz SCS, or 0.125 millisecond corresponding to a half slot duration with 120 kHz SCS;

when the first SCS value is equal to 480 kHz, the value of the first parameter comprises least one of the followings: 2 slots, 4 slots, or 8 slots, and/or the value of the second parameter comprises least one of the followings: 2 symbols, 3 symbols, 6 symbols, 9 symbols, 12 symbols, a half slot, 1 slot, or 2 slots; or when the first SCS value is equal to 960 kHz, the value of the first parameter comprises least one of the followings: 4 slots, 8 slots, or 16 slots, and/or the value of the second parameter comprises least one of the followings: 2 symbols, 3 symbols, 6 symbols, 9 symbols, 12 symbols, a half slot, 1 slot, or 2 slots.

5. The method of claim 1, further comprising determining a span from a set of span combinations.

6. A wireless communication method by a base station, comprising:

controlling a user equipment (UE) to determine a span combination comprising a first parameter and a second parameter for subcarrier spacing higher than 60 kHz, wherein the first parameter is a distance between two consecutive spans, and the second parameter is a span length, wherein the first parameter and the second parameter define a physical downlink control channel (PDCCH) monitoring capability, the PDCCH monitoring capability comprises a number of PDCCH candidates and a number of non-overlapped control channel elements (CCEs), and wherein for a given value of the first parameter, when a value of the second parameter is equal to or less than a threshold value, there is a first PDCCH monitoring capability, and for the given value of the first parameter, when the value of the second parameter is greater than the threshold value, there is a second PDCCH monitoring capability, wherein the threshold value comprises 3 symbols or a half slot, and wherein the number of PDCCH candidates and the number of non-overlapped CCEs in the first PDCCH monitoring capability are different from the number of PDCCH candidates and the number of non-overlapped CCEs in the second PDCCH monitoring capability.

7. The method of claim 6, wherein the first parameter is a distance between starting locations of the two consecutive spans.

8. The method of claim 6, wherein the value of the first parameter and/or the value of the second parameter is in a unit of a slot, a symbol, or an absolute time, and the value of the first parameter and/or the value of the second parameter corresponds to 120 kHz subcarrier spacing (SCS), and/or the first parameter and the second parameter are used for carrier frequency higher than 52.6 GHz.

9. The method of claim 8, wherein the value of the first parameter and/or the value of the second parameter depends on a first SCS value, and one of the following applies:

when the first SCS value is equal to 120 kHz, the value of the first parameter comprises 1 slot corresponding to 1 slot duration with 120 kHz SCS, 2 slots corresponding to 2 slot durations with 120 kHz SCS, or a half slot corresponding to a half slot duration with 120 kHz SCS;

when the first SCS value is equal to 120 kHz, the value of the first parameter comprises 14 symbols corresponding to 1 slot duration with 120 kHz SCS, 28 symbols corresponding to 2 slot durations with 120 kHz SCS, or 7 symbols corresponding to a half slot duration with 120 kHz SCS;

when the first SCS value is equal to 120 kHz, the value of the first parameter comprises 0.03125 millisecond corresponding to 1 slot duration with 120 kHz SCS, 0.0625 millisecond corresponding to 2 slot durations with 120 kHz SCS, or 0.015625 millisecond corresponding to a half slot duration with 120 kHz SCS;

when the first SCS value is equal to 480 kHz, the value of the first parameter comprises 4 slots corresponding to 1 slot duration with 120 kHz SCS, 8 slots corresponding to 2 slot durations with 120 kHz SCS, or 2 slots corresponding to a half slot duration with 120 kHz SCS;

when the first SCS value is equal to 480 kHz, the value of the first parameter comprises 56 symbols corresponding to 1 slot duration with 120 kHz SCS, 112 symbols corresponding to 2 slot durations with 120 kHz SCS, or 28 symbols corresponding to a half slot duration with 120 kHz SCS;

when the first SCS value is equal to 480 kHz, the value of the first parameter comprises 0.125 millisecond corresponding to 1 slot duration with 120 kHz SCS, 0.25 millisecond corresponding to 2 slot durations with 120 kHz SCS, or 0.0625 millisecond corresponding to a half slot duration with 120 kHz SCS;

when the first SCS value is equal to 960 kHz, the value of the first parameter comprises 8 slots corresponding to 1 slot duration with 120 kHz SCS, 16 slots corresponding to 2 slot durations with 120 kHz SCS, or 4 slots corresponding to a half slot duration with 120 kHz SCS;

when the first SCS value is equal to 960 kHz, the value of the first parameter comprises 112 symbols corresponding to 1 slot duration with 120 kHz SCS, 224 symbols corresponding to 2 slot durations with 120 kHz SCS, or 56 symbols corresponding to a half slot duration with 120 kHz SCS;

when the first SCS value is equal to 960 kHz, the value of the first parameter comprises 0.25 millisecond corresponding to 1 slot duration with 120 kHz SCS, 0.5 millisecond corresponding to 2 slot durations with 120 kHz SCS, or 0.125 millisecond corresponding to a half slot duration with 120 kHz SCS;

when the first SCS value is equal to 480 kHz, the value of the first parameter comprises least one of the followings: 2 slots, 4 slots, or 8 slots, and/or the value of the second parameter comprises least one of the followings: 2 symbols, 3 symbols, 6 symbols, 9 symbols, 12 symbols, a half slot, 1 slot, or 2 slots; or when the first SCS value is equal to 960 kHz, the value of the first parameter comprises least one of the followings: 4 slots, 8 slots, or 16 slots, and/or the value of the second parameter comprises least one of the followings: 2 symbols, 3 symbols, 6 symbols, 9 symbols, 12 symbols, a half slot, 1 slot, or 2 slots.

10. The method of claim 6, further comprising controlling the UE to determine a span from a set of span combinations.

11. A user equipment (UE), comprising:

a memory;

a transceiver; and a processor coupled to the memory and the transceiver;

wherein the processor is configured to determine a span combination comprising a first parameter and a second parameter for subcarrier spacing higher than 60 kHz, wherein the first parameter is a distance between two consecutive spans, and the second parameter is a span length, wherein the first parameter and the second parameter define a physical downlink control channel (PDCCH) monitoring capability, the PDCCH monitoring capability comprises a number of PDCCH candidates and a number of non-overlapped control channel elements (CCEs), and wherein for a given value of the first parameter, when a value of the second parameter is equal to or less than a threshold value, there is a first PDCCH monitoring capability, and for the given value of the first parameter, when the value of the second parameter is greater than the threshold value, there is a second PDCCH monitoring capability, wherein the threshold value comprises 3 symbols or a half slot, and wherein the number of PDCCH candidates and the number of non-overlapped CCEs in the first PDCCH monitoring capability are different from the number of PDCCH candidates and the number of non-overlapped CCEs in the second PDCCH monitoring capability.

12. The UE of claim 11, wherein the processor is configured, by a base station, with one or more PDCCH monitoring occasions; and the processor is configured to determine a span from the one or more PDCCH monitoring occasions.

13. The UE of claim 12, wherein the processor is further configured to:

report, to the base station, about one or more supporting span combinations of the UE, wherein the one or more PDCCH monitoring occasions are configured according to the one or more supporting span combinations of the UE;

determine the span combination that the PDCCH monitoring occasion fits in; and use the span combination that gives a maximum number of PDCCH candidates and/or a maximum number of CCEs for PDCCH monitoring.

14. A base station, comprising:

a memory;

a transceiver; and a processor coupled to the memory and the transceiver;

wherein the processor is configured to control a user equipment (UE) to determine a span combination comprising a first parameter and a second parameter for subcarrier spacing higher than 60 kHz, wherein the first parameter is a distance between two consecutive spans, and the second parameter is a span length, wherein the first parameter and the second parameter define a physical downlink control channel (PDCCH) monitoring capability, the PDCCH monitoring capability comprises a number of PDCCH candidates and a number of non-overlapped control channel elements (CCEs), and wherein for a given value of the first parameter, when a value of the second parameter is equal to or less than a threshold value, there is a first PDCCH monitoring capability, and for the given value of the first parameter, when the value of the second parameter is greater than the threshold value, there is a second PDCCH monitoring capability, wherein the threshold value comprises 3 symbols or a half slot, and wherein the number of PDCCH candidates and the number of non-overlapped CCEs in the first PDCCH monitoring capability are different from the number of PDCCH candidates and the number of non-overlapped CCEs in the second PDCCH monitoring capability.

15. The base station of claim 14, wherein the processor is further configured to:

configure, to the UE, one or more PDCCH monitoring occasions; and control the UE to determine a span from the one or more PDCCH monitoring occasions.

16. The base station of claim 15, wherein the transceiver is further configured to receiving a report, from the UE, about one or more supporting span combinations of the UE, the one or more PDCCH monitoring occasions are configured according to the one or more supporting span combinations of the UE;

wherein the processor is further configured to: control the UE to determine the span combination that the PDCCH monitoring occasion fits in; and control the UE to use the span combination that gives a maximum number of PDCCH candidates and/or a maximum number of CCEs for PDCCH monitoring.

* * * * *